US009080295B2

(12) United States Patent
Palazon Martinez et al.

(10) Patent No.: US 9,080,295 B2
(45) Date of Patent: Jul. 14, 2015

(54) REMOVABLE BASE FOR THE VERTICAL ELEMENTS OF STREET FURNITURE

(71) Applicants: Fulgencio Palazon Martinez, Murcia (ES); Maria Josefa Palazon Martinez, Murcia (ES)

(72) Inventors: Fulgencio Palazon Martinez, Murcia (ES); Maria Josefa Palazon Martinez, Murcia (ES)

(*) Notice: Subject to any disclaimer, the term of this patent is extended or adjusted under 35 U.S.C. 154(b) by 0 days.

(21) Appl. No.: 14/354,452

(22) PCT Filed: Oct. 24, 2012

(86) PCT No.: PCT/ES2012/000274
§ 371 (c)(1),
(2) Date: Apr. 25, 2014

(87) PCT Pub. No.: WO2013/060909
PCT Pub. Date: May 2, 2013

(65) Prior Publication Data
US 2014/0291464 A1 Oct. 2, 2014

(30) Foreign Application Priority Data
Oct. 27, 2011 (ES) ...................................... 2404674

(51) Int. Cl.
*F16M 13/00* (2006.01)
*E01F 9/018* (2006.01)
*E04H 12/00* (2006.01)
*E01F 9/016* (2006.01)
*F21W 131/103* (2006.01)

(52) U.S. Cl.
CPC ............... *E01F 9/0182* (2013.01); *E01F 9/016* (2013.01); *E04H 12/00* (2013.01); *F21W 2131/103* (2013.01)

(58) Field of Classification Search
CPC ......... E01F 9/0182; E01F 9/016; E01F 9/018; E04H 12/00; F21W 2131/103
See application file for complete search history.

(56) References Cited

U.S. PATENT DOCUMENTS 3,967,906 A * 7/1976 Strizki .............................. 403/2
6,398,192 B1 * 6/2002 Albritton ..................... 256/13.1
6,422,783 B1 * 7/2002 Jordan .............................. 404/9
6,739,567 B1 * 5/2004 Curtis ........................... 248/548
6,868,641 B2 * 3/2005 Conner et al. .................... 52/98
7,056,056 B2 * 6/2006 Wiegand et al. ................ 404/10
7,955,023 B2 * 6/2011 Sung et al. ...................... 404/10
8,726,582 B2 * 5/2014 Hahin .............................. 52/98
2010/0254760 A1 10/2010 Sung

FOREIGN PATENT DOCUMENTS

EP 1612334 1/2006
GB 2478864 9/2011
WO 03033819 4/2003

* cited by examiner

*Primary Examiner* — Amy Sterling
(74) *Attorney, Agent, or Firm* — Bryant J. Keller; Kirton I McConkie

(57) ABSTRACT

The device includes a base for supporting one or more vertical elements of a piece of street furniture (such as a lamp post, a traffic sign, an advertising post, etc.), wherein the base can include two parts or pieces nested together, one over the other, with a lower part anchored to the ground while the upper part is nested against the other by a pair of flanges. The relative movement between the upper and lower parts is restrained by the action of a brake including a plate which is fastened with a bolt and a nut to the upper part of the base. The plate has a recessed area at each end, where a nylon pellet is placed and whose breakage, when caused by a lateral force to the base, frees the upper part, allowing it to slide over the lower part.

8 Claims, 4 Drawing Sheets

REMOVABLE BASE FOR THE VERTICAL ELEMENTS OF STREET FURNITURE

OBJECTIVE OF THE INVENTION

Figure 1A:
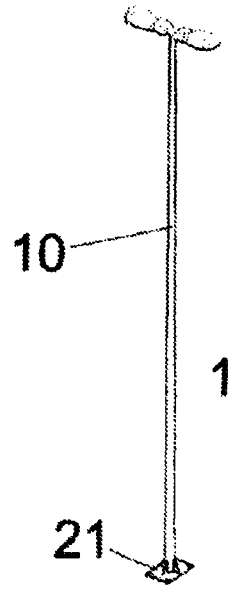

The present invention, as is indicated by the title of this report, refers to a support or base on which to mount the vertical elements of street furniture such as lamp posts, traffic signs, advertising posts, etc., and which has the special feature of two interlocking parts, one over the other, that by employing a simple system of pressure elements prevents the movement of one part against the other.

More specifically, this present model for a base consists of a part that is anchored to the ground by one of the traditional methods used for this purpose, to which is attached an upper part that in turn supports the street furniture element that is to be installed. The geometry of the two parts, which is described below, allows by means of a brake inside of a closed to box to hold the parts firmly together. The dismantlement of the box being only possible by the application of a certain force to the street furniture such as may be caused when struck by a vehicle. In this way, upon the occurrence of an accident of this type, the energy from the crash is absorbed by the brake, which has a small piece which is broken by the strong impact, releasing the upper part of the base, allowing for the street furniture element to move and fall, thus preventing more serious damage to the impacting vehicle.

FIELD OF APPLICATION

Given the characteristics of the invention that is advocated and described below, its principal application will be focused on the manufacture of all types of street furniture.

BACKGROUND

The vertical elements of street furniture, especially lamp posts, traffic signals, posts or billboards, totem signs, etc., because of their abundance within an urban environment pose a significant danger to vehicular traffic. In the event of the loss of control of a vehicle, unfortunately, can result in a collision with one of the vertical elements of the said street furniture.

Also, the resistance that these elements must develop against forces that could cause them to fall is especially high, given that in some cases they are very tall while at the same time being very slender. This fact implies that in the event of an impact by a vehicle against the element, most of the impact energy is absorbed by the vehicle in such a way that the occupants can be seriously injured or killed. Current statistics indicate that collisions against passive elements of road safety devices make up about 2.5% of all accidents, but account for about 5% of traffic deaths.

In other cases, the element is deformed by the collision so that it ends up leaning at an angle with respect to its initial vertical position while its base remains fixed, in such a way that the element then becomes a “launch pad” for the colliding vehicle. This is a common occurrence especially in the case of traffic signs.

Another fact that aggravates the consequences of such accidents is that automobiles are not designed to withstand collisions against slender elements, that is because the automobile’s frame is not able to withstand the impact without deforming In order to minimize the consequences of the collision of a vehicle against these elements a multitude of solutions have been developed, for example, the manufacture of lamp posts made from resins that have lower impact resistance, the installation of special protective devices at the bases of these vertical elements (barriers or buffers), designing lamp posts with long horizontal arms to distance the base of the element away from the roadway, etc. All of these systems offer partial solutions to the problem, in addition to incurring extra costs for the installation of the street furniture, but it continues to be desirable to develop a system that impedes the vertical element from causing damage to a vehicle that collides with it.

The proprietor of this reports is also aware of the existence of an anchoring system consisting of two parts that fit together at each corner of the foundation element, the parts in fact nest together, and present a limited degree of shear resistance. This system is known commercially as Inneo. When a vehicle collides with a vertical post, each pair of parts disengages, freeing the base of the post in such a manner that the post is ejected without causing serious damage to the vehicle. However, this device does not distinguish between a slight impact (due to a car being parked, for example) or a strong impact, causing the base to come free in all cases. In addition, the breakage of some of the bolts that fasten together the nested parts requires that the entire foundation be replaced.

The device described in this report allows the street furniture’s vertical element to come free only when subjected to a certain magnitude of impact, this is due to the provision of a piece that acts as a brake and which must be broken in order for the upper part of the base to come free. The structure of this device in the form of a box is configured as a high resistance element which strong impacts will not deform. There is another advantage of this invention that is of added functionality, the device precludes the theft of the electrical cables from lamp post or poles.

The proprietor of this report knows of no other anchoring device for the vertical elements of street furniture that resolves the cited problems in the manner as described in this report.

DESCRIPTION OF THE INVENTION

The detachable base for the vertical elements of street furniture, the object of this report, consists of two nesting parts, one on top of the other, anchored to the ground by whatever traditional method (thus also serving as the foundation for the vertical element); while the upper part is nested into the lower part by a pair of tracks or flanges.

The relative movement between the upper and lower parts is restrained by the action of a brake formed by a plate which is attached by a bolt and nut to the upper part of the base. The said plate has a recessed area at both ends, where a nylon pellet fits into a slot and also fits between a pair of ridges that are located on the undersides of the two flanges of the base’s bottom part.

In this way, the nylon pellets lock into place and are thus the elements that impede the upper part of the base from sliding over the bottom part. The brake is attached with a nut to the upper part of the base and is tightened by means of a torque wrench capable of applying a torque of at least 20 KN/m2. With collisions of low impact, such as a bump from a car being parked, for example, the two parts of the base cannot slide as the impact is resisted by the nylon pellets. However, a vehicle moving at high velocity imparts such a force on the parts of the base that it causes the nylon pellets to deform and to overload the stops, allowing the upper part of the base to slide and that the vertical element is ejected without causing damage to the vehicle.

The bolt on the plate above the upper part of the base will cause a pressure from the upper part of the base on to the lower part, leaving the nylon pellets confined between the ribs of the flanges of the lower part of the base and the recesses in the brake plate.

Both the upper and lower parts of the base have openings or holes that allow for the passage of electrical cables, tubes, etc., and to allow for the proper functioning of the street furniture elements.

The fact that the upper part slides over the lower part by a predetermined distance implies that upon impact, it is the structure of the base itself what absorbs the moment arm caused by the distance between the forces that act at the instant of impact (one higher up, on the vertical post, and the other on the base.)

The upper and lower parts, when they are assembled one above the other, form a box that serves as a support base suitable for elements of great height or that are subject to high stresses, since the anchorage of the post to the removable base does not influence the functioning of the device. By the configuration of the above mentioned elements, only loads applied laterally at points close to the base can induce relative movement of one part over the other, in such a manner that any other forces will cause the collapse of the structure's device before the flanges slide between them.

Both the lower and upper parts of the box feature plates at their sides that impede access to the inside of the box, the lower side plates of the box also serve as additional reinforcement for the structure. In addition, the upper edge of the reinforcement plates of the lower part of the box marks the limit that the device can be buried so that it functions properly.

In order to stabilise the vertical street furniture element, each corner of the base has a flat pellet whose dimensions allow it to fit into a slot between the flanges between the upper and lower parts. Thus, the action of the said flat pellets prevents any unwanted movement whatsoever and ensures the correct horizontal alignment of the piece that supports the street furniture element.

As the device is configured, when the street furniture element is impacted only the nylon pellets of the brake are broken, the rest of the device are undamaged. To re-erect the element only the nylon pellets need to be replaced, which ultimately saves on road maintenance costs.

Another advantage of this device, is the provision of a series of elements that act as guides or conduits enabling the cables to pass through them and with the subsequent attachment of the cables, in such a way that the cables are gathered together inside the box and are not accessible unless the device is disassembled, which requires the entire disassembly of the vertical element and of the base.

The configuration of the device consisting of two nesting parts by means of the flanges also allows for great freedom of design, and can allow for a wide variety of shapes and designs. It is only necessary to ensure that the flanges are aligned in the direction of the anticipated impact.

DESCRIPTIONS OF THE ILLUSTRATIONS

Figure 1B:
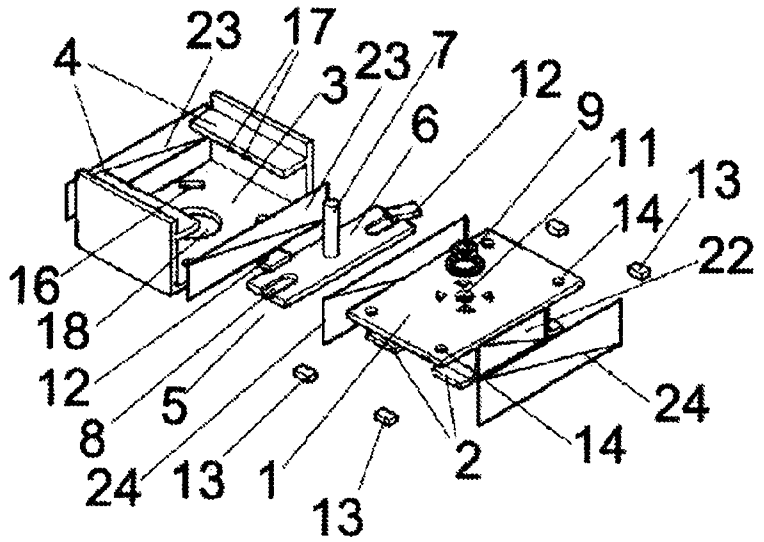

FIGS. 1A-1B. These figures illustrate a representative embodiment of a lamp post and a representative embodiment of an exploded view of the device, which reveals its components. In this latter view the scale of the components of the box have been increased, and appear larger with respect to the lamp post. Visible in this latter view are all of the components of a representative embodiment the invention, with the exception of the mounting bolts and/or nuts.

Figure 2A:
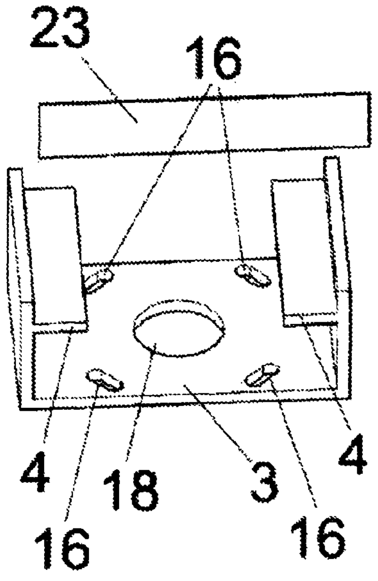
Figure 2B:
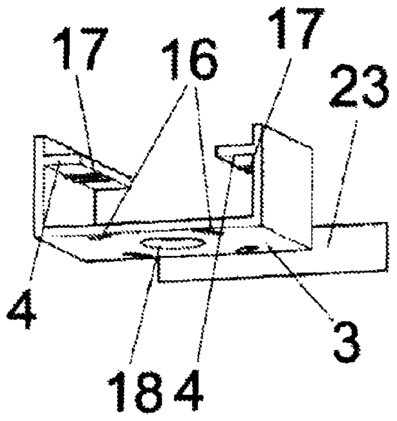

FIGS. 2A-2B. The lower part of a representative embodiment of the box is presented in such illustrations, which are drawn with one of the reinforcing plates shown at the far side of the box, while the plate at the front side of the box has been omitted for easier viewing of the device. In FIGS. 2A-2B, two views are presented, one looking down from above and the other looking up at the bottom of the box from which can be seen the arrangement of the recesses to accommodate the nylon pellets that act as a brake for the assembly in the event of an impact.

Figure 3:
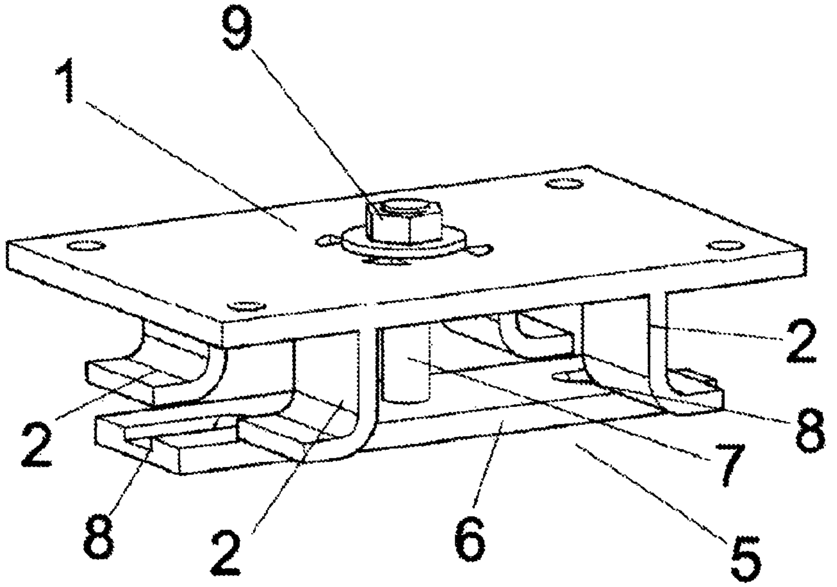

FIG. 3. In accordance with a representative embodiment, the brake assembly is presented in this illustration along with the upper part of the box (without reinforcement), where the brake stud is inserted through the hole of the upper part and which has been threaded to accept a nut that will close the assembly. This assembly is what slides along the flanges of the lower part of the box in the event of an impact and the breaking of the nylon pellet, leaving its confinement space.

Figures 4A, 4B:
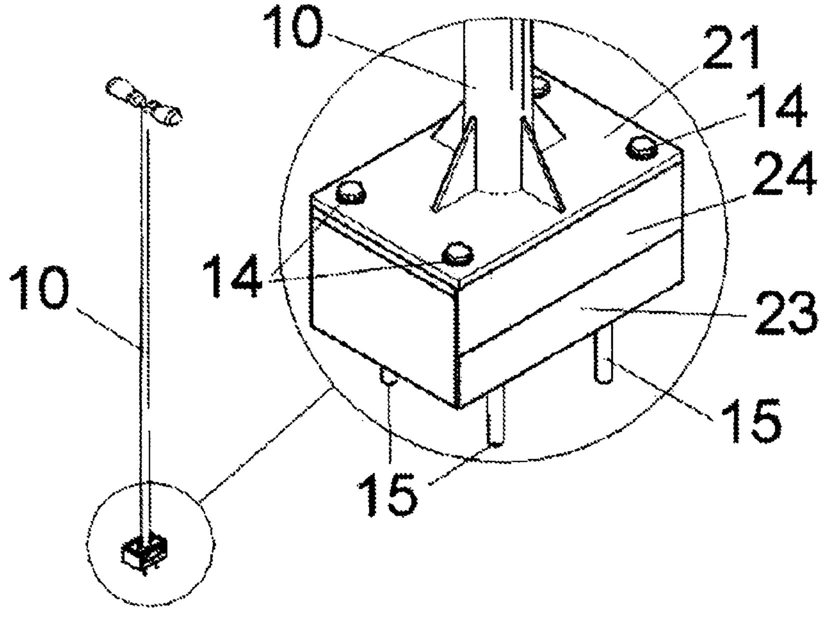

FIGS. 4A-4B. Together FIGS. 4A-4B illustrate all of the parts of a representative embodiment of the street furniture assembled (in this case a lamppost) and ready for use, with the area of the box, or base, shown in greater detail.

Figure 5:
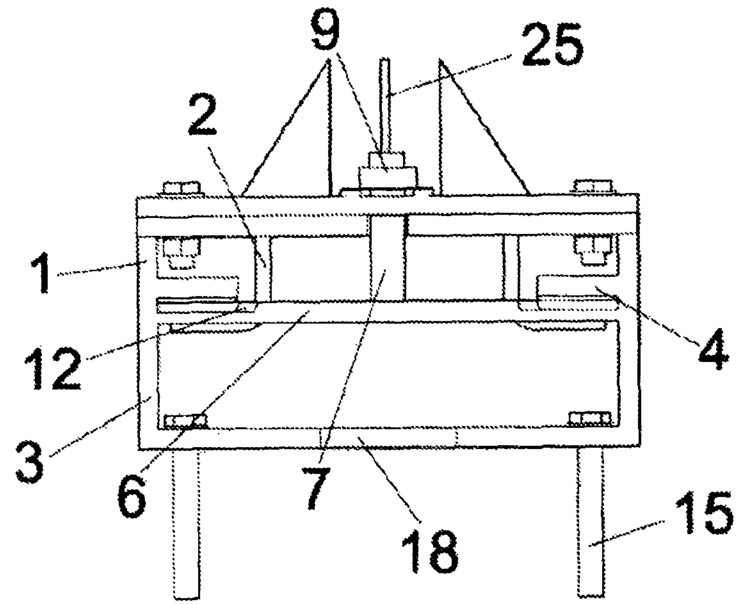

FIG. 5. In this illustration a cross-section along the long axis of the device is presented in accordance with a representative embodiment. In this cross-section are visible the relative positions of the wings with respect to the flanges, the space between them will be filled with the stabilising pellets, as well as the position of the brake with respect to the two components of the box.

Figures 6A, 6B:
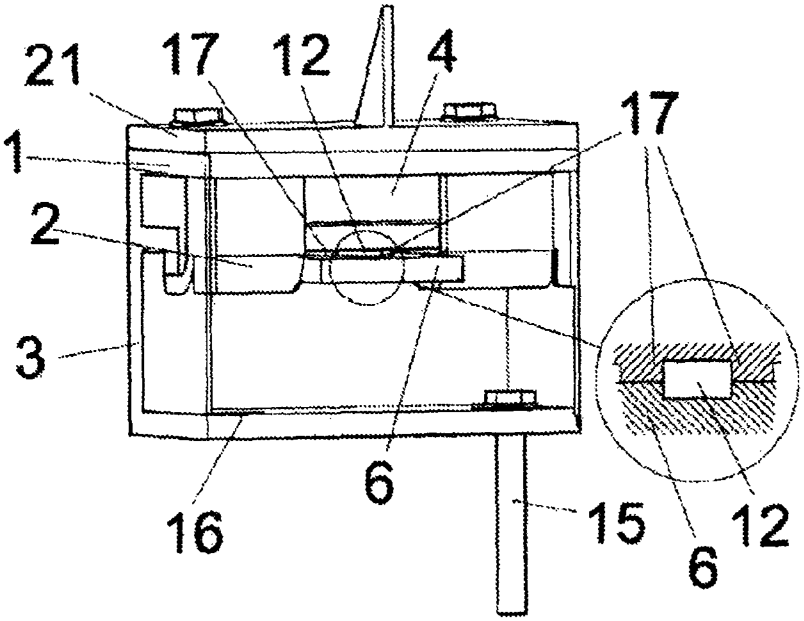

FIGS. 6A. This is a cross-section through the short axis of the box and closer to the end of the box than in FIG. 5, the brake plate is shown cut through, in such a way that the nylon pellet can be seen confined in the existing recess at the end of the brake plate and the protrusions on the lower surface of the flange. In addition, in FIG. 6B, the confinement of the nylon pellet is also shown in a cross sectional detail in accordance with a representative embodiment.

Figure 7:
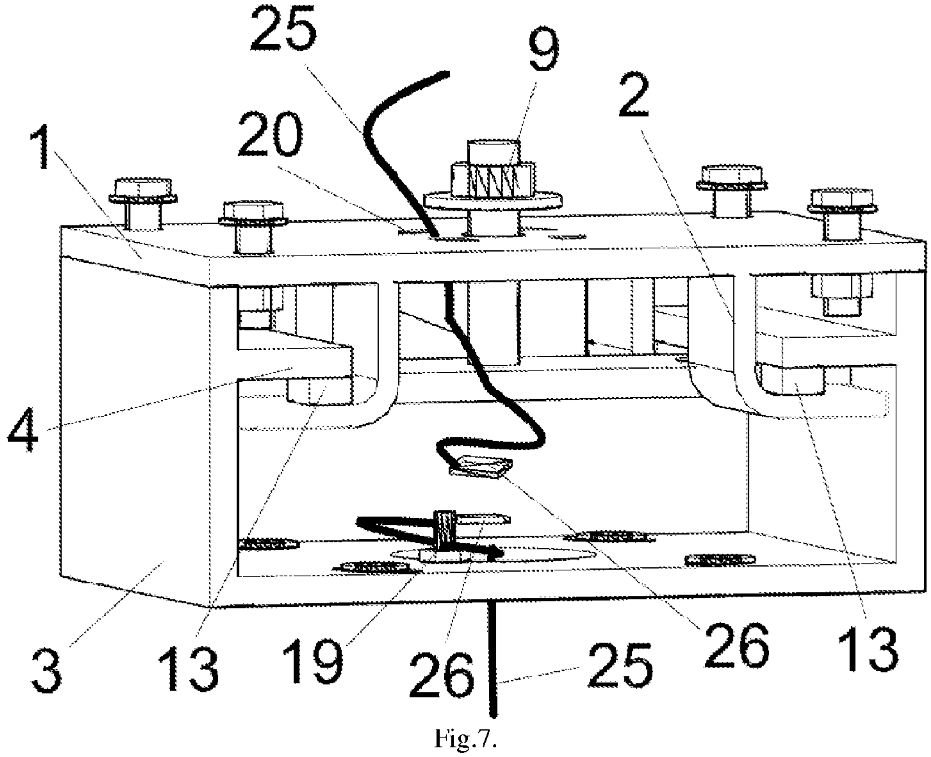

FIG. 7. Shown in this illustration is a representative embodiment of the box assembled without the two closing reinforcements on the side of the box, in such way that it is possible to see the wiring inside of the box and the ends of the wire ready for connection. Also in this view can be seen more clearly the placement of the stabilising pellets at the four corners of the box.

DESCRIPTION OF THE PREFERRED CONFIGURATION

The present invention is illustrated using the following example, this being done as a mean of illustration only and not intending to limit the scope thereof.

The device consists of a detachable base for the support of a street light (10) conforming to the modifications described in this report. The device is configured in the form of a base or box, which primarily consists of an upper part (1), formed by a flat metal plate which has pairs of wings (2) at its ends, in the shape of an "L"; and a lower part (3), with a cross-section in the form of a "U", which in its upper part has a pair of flanges (4) arranged horizontally.

The upper part of the box (1) has a hole (11) at its centre, intended for the insertion of a stud (7) that is part of the brake (5). The said brake (5) is a part formed by a rectangular plate (6) which has a stud (7) at its centre, of a length at least as long as the distance between flanges of the lower part (4) and the upper part of the base.

The brake plate (6) has also recesses (8) at its ends, designed to accommodate the nylon pellets (12) that serve to calibrated the strength of the base. The upper part of the box (1) itself, has a space or gap between the wings (2) in which the brake plate (6) can be accommodated.

Thus, the plate (6) of the brake (5) is housed between the wings (2) of the upper part of the box (1), the said plate located below the height of the flanges (4) of the lower part of the box (3). Passing the stud (7) through the hole (11), and by using a nut (9) the whole assembly can be compressed: by tightening the stud (7), the plate (6) will put pressure on the lower part of the flanges (4), subsequently putting pressure on the four stabilising pellets (13). The nut (9) is tightened with a torque wrench until the pressure exerted by the brake (5) on the ribs (4) is 20 KN/m2.

The lamp post (10) is bolted to the top of the base (1), through four holes (14) provided for this purpose. The bottom of the base (3) is anchored to the ground by means of four studs (15) through the holes (16) provided for this purpose.

In the event of a strong impact, the lamp post (10) will drag the upper part of the box (1), whose wings (2) will in turn force the movement of the brake (5) until it causes the nylon pellets (12) to break against the ribs (17) arranged on the flanges (4). Once this occurs, there is nothing to prevent the upper part (1) from sliding over the lower part (3), freeing the lamp post, which will be propelled by the force of the collision.

The lower part of the base (3) is provided with a hole (18) for the passage of electrical services. Along with this hole (18) there is a welded screw (19), that serves for the subsequent fastening of the cables during the installation of the box. A hole (20) on the upper part of the box (1) that coincides with the top of the screw (19) completes the passage of the cable (25) for fastening. By proving a connector (26) inside of the box, the opposite ends of the cable can be anchored to the screw (19) and the hole (20) by means of a flange, in such a way so as to allow fastening of the two and thus making the electrical connection. Upon impact, the connection (26) will break without damaging the rest of the cable, thus preventing damage to the electrical wiring.

Both the lower part of the box (1) and the upper part (3) are provided with plates (23 and 24) that close off the sides of the box. On the upper part of the box the closure plates (24) have the purpose of closing off the assembly and to prevent dirt from entering into the interior of the device, while the lower portion of the box has side plates (23) that also act as a structural reinforcements. Furthermore, the upper edge of the reinforcing plate (23) of the lower part of the box marks the limit that the device can be buried to for its proper functioning. In addition, the reinforcing plate of the upper part of the box (22) prevents deformation of the same.

The stopping pellets (13) have a safety screw that mechanically joins the two cover plates (24) of the upper part of the box. Thus, under an impact, the stopping pellets will not at any time be forced out, rather a pair will remain attached to the underside of the base (3) and the other pair will remain attached to the upper part (1).

The nature of the present invention has been sufficiently described, as well as the manner of its proper operation, it should be stated that given its essential characteristics, it can be used in ways that differ from the method described in the example given above and which can afford similar protection, provided always that the device is not altered, changed or modified in its fundamental principle.

The invention claimed is:

1. A removable base for a vertical element of a piece of street furniture comprising: an upper part formed by a flat metal plate which has a pair of wings at each end, in the shape of an “L” and of a lower part in the form of a “U”, which in its upper portion has a pair of flanges arranged horizontally which also have ribs arranged substantially symmetrical with respect to a transverse axis of the pair of flanges, a group of stop pads, a pair of pellets, a brake formed by a rectangular plate which has a stud at its centre and a vertical element of a furniture item that is joined to the upper part by an anchor plate, wherein the upper part comprises the pair of wings at an interior of the upper part; and wherein the lower part has in its upper portion the pair of flanges arranged horizontally, so that by coupling the upper part with the lower part, the pair of wings and the pair of flanges have their faces substantially parallel to each other, separated by a space substantially equal to a width of the stop pads which are inserted into each of four corners of the removable base; where the pair of wings of the upper part are suspended in a central area, in a width equal to that of the rectangular plate, having the stud of the brake of a length at least 3 cm longer than an existing length of a lower face of the flanges and an upper face of the upper part of the removable base having the rectangular plate of the brake with a respective recess at each end of the rectangular plate that are each provided with at least one of the pair of pellets, which are embedded in the recesses and stop pads.

2. The removable base of claim 1, wherein the stud is arranged so that its end protrudes above the upper part of the removable base with a threaded nut that secures the upper part and the lower part together.

3. The removable base of claim 2, wherein the nut is tightened until the pressure on the brake and exerted on the pair of flanges reaches a torque resistance of at least about 20 kN/m2.

4. The removable base of claim 1, wherein both the lower part as well as the upper part of the removable base are respectively provided with a first and a second reinforcing plate and wherein the removable base further comprises a closing plate, which serves as an upper edge of the first reinforcing plate of the lower box and marks a limit to which the removable base can be buried for it to function properly.

5. The removable base of claim 1, further comprising a security screw for the stop pads, which links them to a closing plate of the upper part of the removable base.

6. The removable base of claim 1, wherein the upper part and the lower part are provided with respective anchor points for a wiring connection.

7. The removable base of claim 4, further comprising a security screw for the stop pads, which links them to the closing plate.

8. The removable base of claim 1, wherein the pair or pellets comprise at least one of nylon and a material with properties similar to nylon.

* * * * *